United States Patent
Dunbar

[11] 3,908,695
[45] Sept. 30, 1975

[54] HYDRAULIC ROTATOR MECHANISM

[76] Inventor: Glenn G. Dunbar, 2608 Overbrook Dr., Toledo, Ohio 43614

[22] Filed: Dec. 28, 1973

[21] Appl. No.: 429,118

[52] U.S. Cl. .............................. 137/580; 285/136
[51] Int. Cl.² ........................................ F16K 39/00
[58] Field of Search ...................... 137/580; 285/136

[56] References Cited
UNITED STATES PATENTS

| | | | |
|---|---|---|---|
| 1,891,670 | 12/1932 | Ernst | 285/136 |
| 1,907,099 | 5/1933 | Ernst | 285/136 |
| 2,308,137 | 1/1943 | White | 137/580 |
| 2,362,581 | 11/1944 | Newcomb | 137/580 X |
| 2,419,906 | 4/1947 | Mills | 285/136 |

*Primary Examiner*—Henry T. Klinksiek
*Attorney, Agent, or Firm*—Richard D. Emch

[57] ABSTRACT

The invention is a hydraulic rotator mechanism for use on material handling or other hydraulic equipment wherein a hydraulically operated implement is rotatable with respect to a support member. The mechanism provides for unlimited rotation of the implement in either direction without the twisting of flexible hydraulic lines which serve the implement. This is accomplished through the use of hydraulic fluid bores within the rotational output shaft of the rotator, the upper ends of the bores being in fluid communication with non-rotational hydraulic fluid passageways connected to fluid lines leading to a hydraulic source. The lower ends of the bores are in communication with lines leading from the rotational output shaft directly to the hydraulic implement, which may be operated continuously during its rotation. A motor is geared to the output shaft and is provided for rotationally driving the mechanism.

8 Claims, 4 Drawing Figures

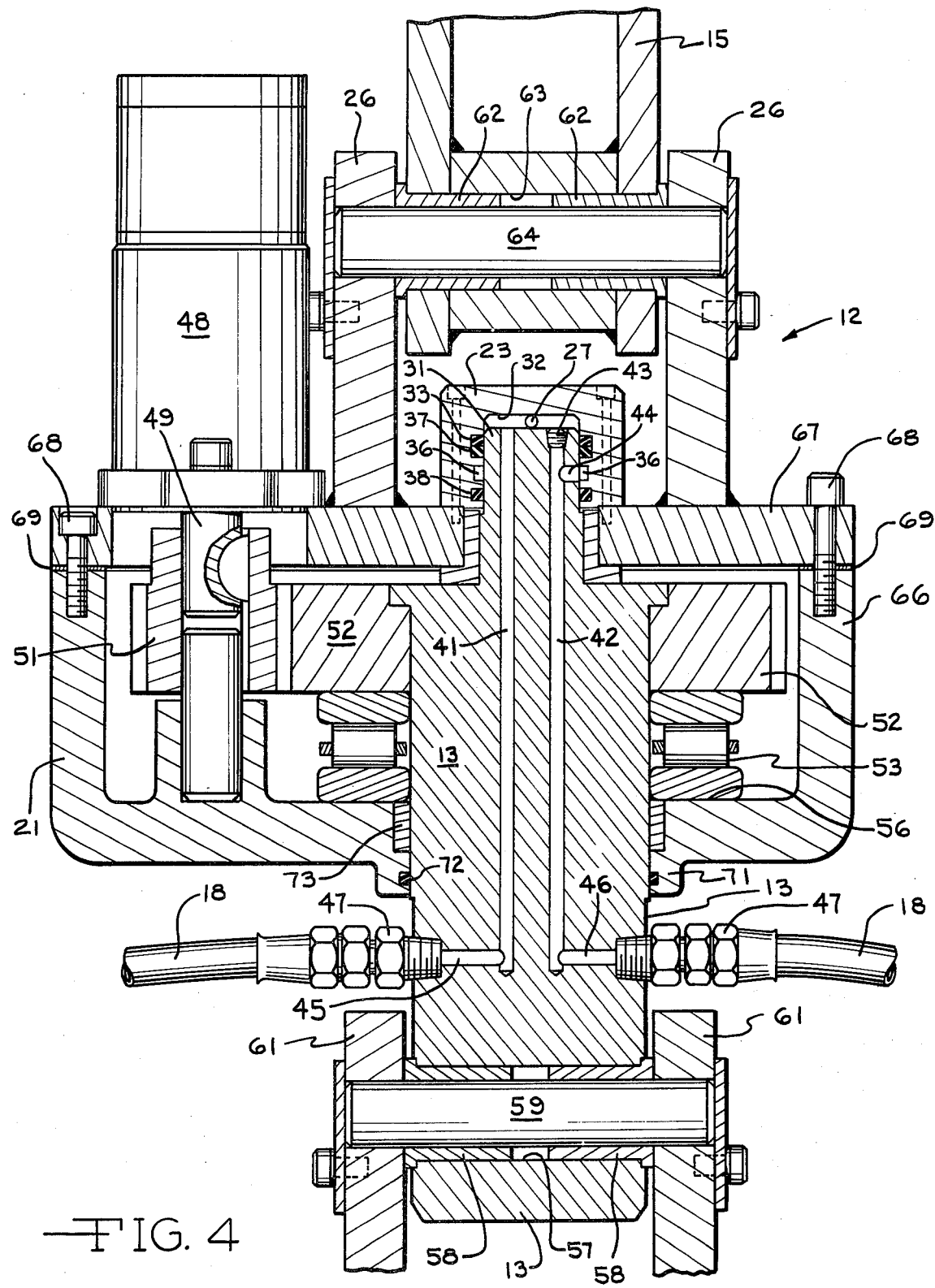

HYDRAULIC ROTATOR MECHANISM

BACKGROUND OF THE INVENTION

The invention relates to hydraulic equipment, and more particularly to equipment including a hydraulically operated implement rotatable with respect to a support member.

In hydraulic equipment wherein a hydraulically operated implement is rotatable from a non-rotatable support such as a crane boom, flexible hydraulic lines extending from the end of the support to the hydraulic implement are generally provided. With such an arrangement, rotation of the implement in a given direction is limited by the flexible lines, necessitating an unwinding of the twisted lines after maximum winding has occurred. To protect the lines, such assemblies usually include stop means limiting the range of rotation in either direction to approximately one turn. Thus, when the rotatable implement is in a position close to the stop means, a small amount of rotation desired in one direction necessitates nearly a full turn in the opposite direction. Because of this shortcoming of prior art hydraulic equipment, an operator of material handling equipment loses a degree of maneuverability as well as time in utilizing the equipment.

SUMMARY OF THE INVENTION

The present invention provides apparatus capable of eliminating the above problems inherent in many prior art hydraulic equipment including rotating hydraulic implements. The apparatus includes a housing suspended from a support member such as the end of a boom. An output shaft rotatable within the housing extends downwardly out of the housing for connection to a hydraulically operated implement such as a pallet fork or a clamping device for use in material handling operations. A motor mounted on the housing is operably connected to the rotatable output shaft. The motor may be hydraulic, supplied by fluid lines from a hydraulic source extending from the support member to the motor.

Separate fluid supply lines, ultimately connected to a hydraulic source and controls, extend from the support member to the rotator housing for operation of the rotatable hydraulically operated implement. These fluid lines are connected into a cap on the housing which includes a fluid passageway in communication with each fluid line. The fluid passageways are also in communication with longitudinal bores in the rotatable output shaft, one bore being provided for each fluid line. The fluid passageways may include chambers defined between the upper end of the output shaft and the housing cap, annular grooves defined within the inner surface of the housing cap adjacent the output shaft, or both. The longitudinal bores are put in fluid communication with their respective annular grooves by means of transverse ducts leading from the longitudinal bores to the periphery of the output shaft. The various fluid passageways defined in the cap are sealed from one another by means of resilient ring seals. Near the lower end of the rotatable output shaft, the longitudinal bores are connected in communication with fluid lines through transverse ducts and standard fluid couplings. These output hydraulic lines lead to the hydraulically operated implement and rotate along with the output shaft and the implement.

BRIEF DESCRIPTION OF THE DRAWINGS

FIG. 4 is a sectional view taken along the line 4—4 of FIG. 2.

DESCRIPTION OF THE PREFERRED EMBODIMENT

Figure 1:
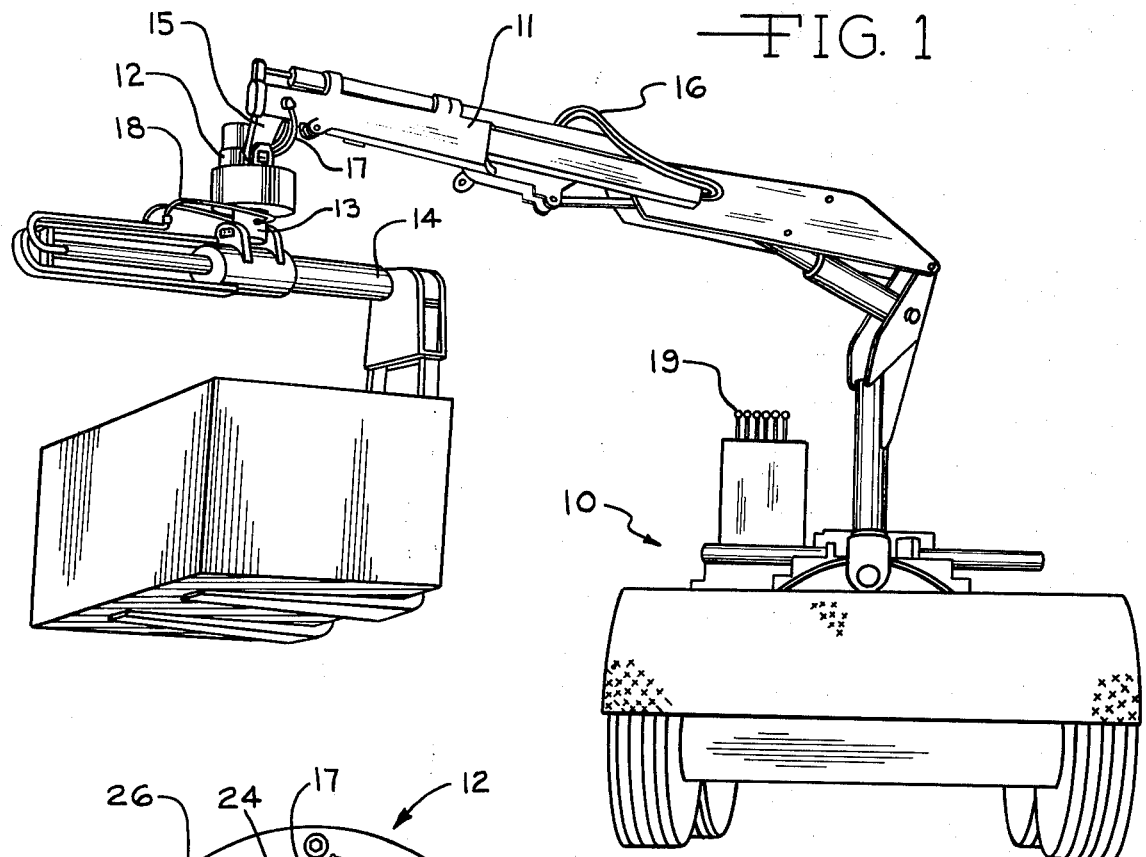
FIG. 1 is a perspective view showing a crane with a hydraulically operated reciprocable pallet fork which is rotatable by a hydraulic rotator mechanism according to the present invention.

FIG. 1 of the drawings shows a material handling truck mounted crane generally indicated by the reference number 10. Operably mounted on the crane 10 is a boom 11 having a bracket 15. The bracket 15 supports a hydraulic rotator mechanism 12 according to the invention. Mounted on an output shaft 13 of the rotator mechanism 12 is a hydraulically operated reciprocable pallet fork 14. Hydraulic lines 16, 17 and 18 convey hydraulic fluid to and from the boom 11, rotator mechanism 12 and pallet fork 14 in response to controls 19 mounted on the crane 10.

Figure 2:
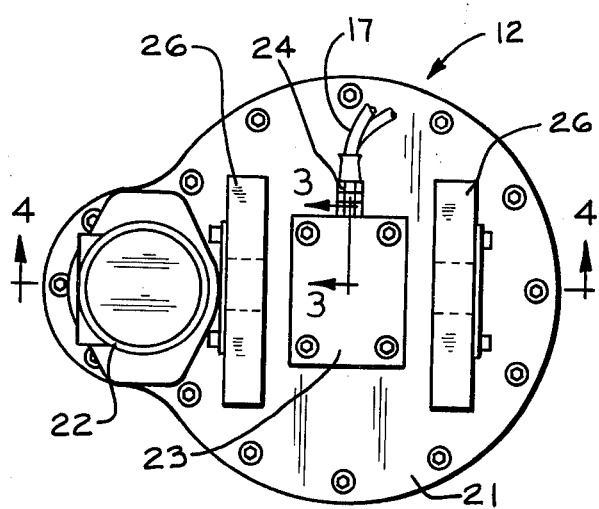
FIG. 2 is a plan view of the rotator mechanism indicated with the supporting crane removed.

FIG. 2 shows the hydraulic rotator mechanism from above, with the boom 11 and support bracket 15 removed for clarity. The mechanism 12 includes a housing 21, a motor 22 and a hydraulic fluid cap 23 connected by fluid connectors 24 to fluid lines 17 which serve the hydraulic pallet fork 14. Brackets 26 connected to the housing 21 support the rotator mechanism 12 from the crane support bracket 15. The fluid cap 23 may be provided as an integral part of the housing 21.

Figure 3:
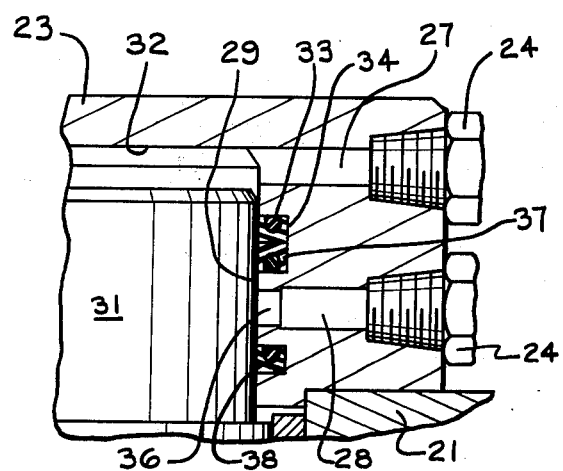
FIG. 3 is a sectional view taken along the line 3—3 of FIG. 2.

The hydraulic fluid cap 23 is shown in detail in FIG. 3. The fluid connectors 24 connect into the cap 23 for communication with fluid ducts 27 and 28 within the cap 23. A central bore 29 in the cap 23 receives an upper neck 31 of the output shaft 13, as best seen in FIG. 4. Above the shaft neck 31 is defined a fluid chamber 32 in the fluid cap 23, in fluid communication with the fluid duct 27. A resilient ring gasket 33 within a channel 34 defined around the periphery of the central bore 29 provides a fluid seal for the fluid chamber 32. The fluid duct 28 communicates with an annular groove 36 defined around the bore 29, serving as a second fluid chamber independent of the upper fluid chamber 32. Although this groove position is preferred, an annular groove may alternatively be defined around the outer periphery of the shaft neck 31 for communication with the fluid duct 28. Resilient gasket rings 37 and 38 provide seals for the annular fluid passageway 36. The ring gaskets 33, 37 and 38 are preferably directional gaskets, which provide a strong seal against fluid seepage from one direction only. Thus, the gaskets 33 and 37 reside in back-to-back relationship within the channel 34.

FIG. 4 shows the entire rotator mechanism in cross section, indicating the remainder of the fluid paths from the fluid connectors 24 of FIG. 3 to the hydraulic lines 18 leading to the hydraulic implement 14. The output shaft 13 is provided with longitudinal fluid passageways 41 and 42 in communication with the fluid chambers 32 and 36, respectively. As indicated in FIG. 4, the passageways 41 and 42 may be bored into the output shaft 13 from the top end, with a plug 43 being provided to seal the passageway 42 at its upper end. A transverse duct 44 establishes communication between the passageways 42 and the annular fluid groove 36. At the lower end of the fluid passageways 41 and 42, transverse ducts 45 and 46 connect the fluid passageways 41 and 42, respectively, with fluid connectors 47 and fluid lines 18 leading to the hydraulically operated implement 14.

Although FIG. 4 indicates two longitudinal passageways 41 and 42 through the output shaft 13, one connected to a top fluid chamber 32 and one to an annular chamber 36, both passageways 41 and 42 may be connected to separately sealed annular fluid chambers (not shown). Additional longitudinal fluid passageways for additional hydraulic equipment may be provided, each additional passageway being in communication with a separately sealed annular fluid chamber. Likewise, the upper fluid chamber 32 may be sealingly divided into a plurality of circular fluid chambers, each being connected to a separate longitudinal fluid passageway and to a separate fluid supply line.

FIG. 4 also indicates the mechanical assembly details of the hydraulic rotor mechanism 12. A motor 48 mounted on the housing 21 drives a shaft 49 and a gear 51, which is keyed to the shaft 49. The motor 48 may be electric, but is preferably hydraulic, operable from the controls 19. An output drive gear 52, positively connected to the output shaft 13, meshes with the motor gear 51 to drive the output shaft 13. A roller thrust bearing 53 is operably disposed between an edge surface of the drive gear 52 and a surface 56 on the housing 21, enabling the output shaft 13 to bear heavy downward loads (as viewed in FIG. 4).

Near the lower end of the output shaft 13 is a transverse bore 57 which receives bearing sleeves 58. The bearing sleeves 58 coaxially mount a pin 59 which provides a pivotal connection between the output shaft 13 and a pair of bracket flanges 61 attached to the hydraulic implement 14. A similar pivotal connection is provided between the crane support bracket 15 and the brackets 26 connected to the upper end of the housing 21. A pair of bearing sleeves 62 are positioned within a bore 63 in the support bracket 15 to receive a pivot pin 64 supporting the housing brackets 26.

As indicated in FIG. 4, the housing 21 comprises a gear case 66 and a cover 67. The brackets 26 are welded to the cover 67. Bolts 68 are provided to retain the cover 67 to the gear case 66. A gasket 69 is interposed between the case 66 and the cover 67 for sealing the housing 21 against leakage of lubrication fluid. At the lower end of the gear case 66 is a sealing lip 71 which retains a resilient ring gasket or O-ring 72 for sealing the housing 21 against lubrication fluid leakage around the output shaft 13. A bearing 73 is positioned within the gear case 66 above the lip 71 and an upper flanged bearing is provided between the neck of the output shaft 13 and the cover 67 immediately below the fluid cap 23.

The above-described preferred embodiment provides a hydraulic rotor mechanism capable of continuously rotating a hydraulic implement without interrupting the flow of operating fluid to and from the implement. The mechanism is rugged and durable under heavy loading conditions while at the same time relatively simple and inexpensive to manufacture. Various other embodiments and alterations to this preferred embodiment will be apparent to those skilled in the art and may be made without departing from the spirit and scope of the following claims.

What I claim is:

1. A hydraulic rotator mechanism for use on hydraulic equipment wherein a hydraulically operated implement is rotatable with respect to a support member, comprising, a housing having brackets for connection to such support member, said housing having upper and lower bores defined therethrough, a hydraulic fluid cap connected to said housing adjacent one of said bores, said cap having fluid connectors for receiving hydraulic fluid lines extending from such support members and connected to a hydraulic fluid source, said cap defining a cylindrical bore axially aligned with said bores in said housing, a rotatable output shaft positioned within said bores of said housing and said bore of said cap, said shaft including a plurality of longitudinal passageways and a plurality of transverse fluid ducts rotatable with said output shaft near the lower end of said shaft establishing communication between said longitudinal passageways and lower fluid lines leading to such hydraulically operated implement, whereby said rotatable output shaft, such lower fluid lines and such implement rotate together without twisting of such fluid lines, and means within said fluid cap for establishing fluid communication between each upper fluid line and a corresponding longitudinal passageway.

2. The hydraulic rotator mechanism of claim 1 which further includes a hydraulic motor mounted on said housing and operably connected to said rotatable output shaft.

3. The hydraulic rotator mechanism of claim 1 which further includes a thrust bearing supporting said rotatable output shaft within said housing.

4. The hydraulic rotator mechanism of claim 1 wherein said communication means comprises a generally cylindrical fluid chamber defined within said bore of said hydraulic fluid cap adjacent the upper end of said rotatable output shaft, said fluid chamber being in communication with one of said fluid supply lines and with one of said longitudinal passageways, at least one annular groove defining an annular fluid chamber adjacent the periphery of said bore of said cap, said annular chamber being in communication with another of said fluid supply lines, a transverse duct within said rotatable output shaft establishing communication between another of said longitudinal passageways and said annular fluid chamber, and means for sealing each fluid chamber against leakage of hydraulic fluid therefrom.

5. The hydraulic rotator mechanism of claim 4 wherein said sealing means comprises annular channels defined in said bore of said cap between adjacent fluid chambers and below said annular fluid chamber, each channel containing a resilient gasket ring contacting said output shaft and sealing said chambers against fluid leakage along said output shaft.

6. The hydraulic rotator mechanism of claim 1, wherein said fluid cap defines a fluid chamber adjacent said first end of said output shaft, said fluid chamber being in fluid communication with said fluid supply means and one of said plurality of passageways, at least one annular groove defining an annular fluid chamber adjacent the periphery of said first end of said output shaft, said annular fluid chamber being in fluid communication with said fluid supply means and another one of said plurality of passageways and means for sealing each fluid chamber against leakage of hydraulic fluid therefrom.

7. A hydraulic rotator mechanism for use on hydraulic equipment including a hydraulically operated implement rotatable with respect to a support member, comprising, a housing having brackets for depending from such support member and having a bore defined therein, said bore being in communication with upper hydraulic fluid lines extending from said support member and connected to a hydraulic source, a rotatable output shaft positioned within said bore and extending downward out of said housing, said shaft including a plurality of longitudinal fluid passageways rotatable with said output shaft and having outlets near the lower end of said shaft establishing communication between said longitudinal passageways and lower fluid lines for leading to such hydraulically operated implement, whereby said rotatable output shaft, such lower fluid lines and such implement rotate together without twisting of such fluid lines, and means within said bore for establishing fluid communication between each upper fluid line and a corresponding longitudinal passageway.

8. A hydraulic rotator mechanism for use on hydraulic equipment, wherein a hydraulically operated implement is rotatable with respect to a support member, comprising, a housing having bracket means for connecting said housing to such support member, a rotatable output shaft mounted within said housing and having first and second ends extending outwardly from said housing, a rotator gear mounted on said output shaft and positioned within said housing, a drive motor mounted on said housing, said drive motor having a drive shaft, a drive gear mounted on said drive shaft in meshing engagement with said rotator gear, a hydraulic fluid cap mounted on said housing over said first end of said output shaft, said output shaft defining a plurality of passageways rotatable with said output shaft, fluid connector means in communication with each of said passageways adjacent said second end of said output shaft, fluid supply means in communication with each of said passageways adjacent said first end of said output shaft for supplying fluid to the hydraulically operated implement, and implement means adjacent said second end of said output shaft for mounting a hydraulically operated implement for 360° rotation, whereby said rotatable output shaft, such fluid connector means and such implement rotate together.

* * * * *